United States Patent Office 3,109,235
Patented Nov. 5, 1963

3,109,235
COMPOSITE METAL PRODUCTS
Geoffrey T. Harris, Sheffield, and Henry C. Child, Rotherham, England, assignors to The Birmingham Small Arms Company Limited, Birmingham, England
Filed Aug. 24, 1960, Ser. No. 51,583
Claims priority, application Great Britain Aug. 27, 1959
7 Claims. (Cl. 29—528)

In the welding and similar methods of joining together metal pieces or articles of different characteristics, particularly where the coefficients of expansion are sufficiently different to give rise to unsatisfactory joints, it has been found advantageous to employ transition pieces between the two metal articles, such transition pieces having properties, particularly those of thermal expansion, which lie between those of the two metal pieces or articles. An illustration is in the production of a component, containing both ferritic and austenitic steels. In general it is difficult to weld directly together a piece, particularly a large piece, of austenitic steel and a piece of ferritic steel, due largely to the difference in thermal expansion of the two qualities of steel. The use of a transition piece which is welded, on the one hand, to the austenitic steel and, on the other hand, to the ferritic steel removes a number of the difficulties encountered in attempting to make a direct joint.

Most of the methods utilizing transition pieces are based on some type of conventional fusion or pressure welding. While these have proved reasonably satisfactory in service, they give rise to the normal difficulties encountered in ensuring satisfactory adhesion of the weld and, particularly in large components, the inspection and control of such production to ensure that the weld has been properly made are expensive and difficult.

According to the present invention a method of manufacture of a transition piece for joining together by welding or the like two metal pieces or articles of different characteristics comprises the steps of melting in immediate succession in a consumable-electrode arc-furnace at least two electrodes of suitable different metal compositions and solidifying the melt as it is progressively formed.

The suitable metal compositions are such that the electrodes are capable of being melted in a consumable-electrode arc-furnace and such as to produce a composite product on solidifying the melt which will have at one end characteristics, in particular thermal expansion, similar to one of the metals to be joined and at the other end characteristics similar to the other metal to be joined, with a transition zone of intermediate characteristics between the two ends. Preferably the compositions which will form the two ends of the electrode after melting are respectively substantially similar to the compositions of the two metals to be joined.

Figure 1:
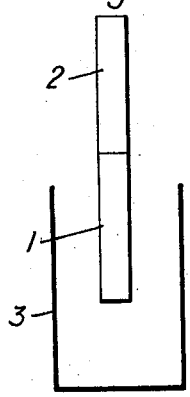
Figure 2:
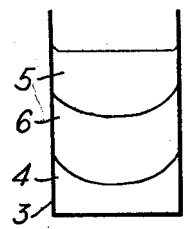

Preferably the two or more electrodes are secured together in end to end relation so as to form a composite electrode for melting. They may, for example, be welded together. The accompanying drawing illustrates diagrammatically such a preferred method of performing the invention. FIGURE 1 shows a composite electrode, formed from electrodes 1, 2, of different characteristics, in position for melting into the water-cooled copper crucible 3 of a consumable-electrode arc-furnace. The composite electrode is melted progressively from one end to the other by striking an arc between it and the crucible, and the melt is solidified in the crucible forming a composite product as shown in FIGURE 2 having zones 4, 5 at its ends with characteristics respectively similar to the electrodes 1, 2 and a transition zone 6 of intermediate characteristics.

The melting currents used are in general towards the bottom end of the range of currents normally employed in the consumable-electrode arc process, because it is desired to minimise the depth of the molten pool and so the extent of the transition zone. Suitable melting currents for different diameter electrodes are given below:

| | Amps |
|---|---|
| 3" diameter electrodes | 1000–2000 |
| 6" diameter electrodes | 1500–4000 |
| 9" diameter electrodes | 3000–6000 |
| 12" diameter electrodes | 6000–10,000 |
| 16" diameter electrodes | 7000–14,000 |

The melting may be carried out either in vacuum in an inert atmosphere such as argon or in air with a suitable protective slag. In general, the process is best carried out under vacuum.

The invention is applicable to both ferrous and non-ferrous metals and to joints between ferrous and non-ferrous metals. It is, however, particularly suitable for the production of transition pieces for use in the welding together of an element of austenitic steel and an element of ferritic steel. In such a case one of the members would be of ferritic steel welded to another of austenitic steel to form a consumable electrode which, after melting in the normal way in a consumable-electrode arc-furnace, would give rise to an ingot having a ferritic steel (or substantially ferritic steel) at one end, and an austenitic steel (or substantially austenitic steel) at the other end with a transition zone of intermediate composition between the two.

Examples of suitable austenitic steels are:

R 20

| | Percent |
|---|---|
| Carbon | 0.11 |
| Manganese | 1.30 |
| Silicon | 0.50 |
| Nickel | 12.0 |
| Chromium | 18.75 |
| Niobium | 1.25 |
| Iron and impurities | Balance |

316

| | Percent |
|---|---|
| Carbon | 0.1 |
| Chromium | 17.0 |
| Nickel | 12.0 |
| Molybdenum | 2.5 |
| Iron and impurities | Balance |

Examples of suitable ferritic steels are:

H 40

| | Percent |
|---|---|
| Carbon | 0.23 |
| Manganese | 0.3 |
| Silicon | 0.45 |
| Nickel | 0.3 |
| Chromium | 2.7 |
| Molybdenum | 0.5 |
| Vanadium | 0.75 |
| Tungsten | 0.5 |
| Iron and impurities | Balance |

H 57

| | Percent |
|---|---|
| Carbon | 0.15 |
| Manganese | 0.45 |
| Silicon | 0.30 |
| Chromium | 2.25 |
| Molybdenum | 1.0 |
| Iron and impurities | Balance |

The coefficient of thermal expansion from 20° C. to 600° C. is approximately $18.6 \times 10^{-6}$ per degree C. for these austenitic steels, and approximately $13.6 \times 10^{-6}$ per degree C. for these ferritic steels. These values illustrate the range of thermal expansion which it is possible to achieve in a simple ferritic-austenitic transition piece.

In general it has been found that most of the austenitic and ferritic heat resisting steels may be satisfactorily manufactured into such joints. However, a refinement which may be advantageous in certain instances is the use of a high percentage of strong carbide former, such as niobium, titanium, tantalum, vanadium, in the austenitic steel. Some of this strong carbide forming element occurs in the zone of transition compositions and by removing the carbon from solution in the steel it prevents excessive hardenability of the transition zone. Such a feature is more essential when the composition of the ferritic steel being used is high in carbon, but it is unnecessary for the more normal range of carbon contents found in creep resistant ferritic steels, i.e. less than .3%.

It has also been found advantageous in some circumstances to forge the transition pieces in order to improve the mechanical properties. They may, for example, be upset to a larger cross-sectional area. For joining together pipes or other tubular members, tubular transition pieces are required. These may be produced for example by hot piercing the composite products of the arc-furnace or by machining. If forging is desirable in a tubular transition piece, in order to obtain improved properties, the composite product may be upset before piercing or machining, or it may be forged or drawn out on a mandrel after piercing or machining. A combination of these forging methods may also be used.

In an example, a transition piece of 12" diameter was made from a composite electrode of H 57 and R 20 melted in a consumable-electrode arc-furnace at 3,600 amps. The composite product was upset, pierced and drawn out to a tubular transition piece of 9" outside diameter and 5" inside diameter. Test pieces were machined from the tube in various positions and the results obtained from them are given in the tables below:

*Tensile Tests*

| Position of test piece | 1% proof stress, tons per sq. inch | Ultimate tensile stress, tons per sq. inch | Elongation, percent | Reduction in area, percent |
|---|---|---|---|---|
| R 20 Parent metal | 22.2 | 39.4 | 46.0 | 60.0 |
| Do | 20.2 | 38.9 | 46.0 | 62.5 |
| R 20/Trans | 15.0 | 39.6 | 47.4 | 1 50.8 |
| Do | 14.8 | 39.2 | 44.6 | 1 54.2 |
| H 57 | 21.8 | 37.9 | 29.5 | 67.0 |
| Do | 20.0 | 37.3 | 32.0 | 62.5 |
| R 20/H 57 | 24.0 | 38.8 | 20.2 | 2 66.7 |
| Do | 20.3 | 38.0 | 20.3 | 2 63.8 |

Comparative properties of R 20 and H 57 steels are as follows:

| R 20 | 13.5 | 38.5 | 52.0 | 60.5 |
|---|---|---|---|---|
| H 57 | 15.3 | 32.6 | 40.0 | 53.0 |

1 Failed in R 20.
2 Failed in H 57.

*Impact Tests (VSM Standard Tests)*

Position of test piece: Impact, mkgm./cm.²
Transition zone _____ 4.41
H 57 _____ 13.14
R 20 _____ 9.27
H 57 _____ 11.77
Transition zone _____ 6.64
H 57 _____ 12.81

*Bend Tests*

| Position of test piece | Radius of bend Thickness of Test piece | Angle |
|---|---|---|
| Transition zone/R 20 | 3.16 | 180° |
| Transition zone | 1.86 | 180° |

As mentioned composite products from the arc-furnace may be used as cast for transition pieces or may be machined and/or forged to any desired shape according to the shape of the metal articles to be joined. Also two or more transition pieces may be joined together in any suitable manner to form a larger transition piece.

We claim:
1. Method of manufacture of a transition piece for joining together by welding two metallic members having different coefficients of thermal expansion, wherein the transition piece is produced by securing together in end to end relation two metal pieces having characteristics respectively similar to the two metallic members to be joined, said metal pieces constituting electrodes capable of being melted in a consumable-electrode arc-furnace, and melting the united metal pieces progressively from one end to the other to produce on solidification a composite transition piece having zones at its ends with characteristics respectively similar to the two metallic members and a transition zone of intermediate characteristics.

2. Method according to claim 1, wherein the two metal pieces are welded together prior to melting.

3. Method according to claim 1, wherein the two metal pieces are respectively of substantially similar constitution to the two metallic members to be joined.

4. Method according to claim 3 for producing a transition piece for joining together austenitic and ferritic steel members, in which two metal pieces, one of austenitic steel and one of ferritic steel, are united to constitute the electrodes.

5. Method according to claim 1 including the step of forging said transition piece produced on solidifying the melt to a desired shape corresponding to the shape of the members to be joined.

6. Method according to claim 1 for producing a transition piece for joining pipes or like tubular members, including the step of forming the solidified transition piece into tubular shape with annular end zones of said different characteristic metals joined by said transition zone.

7. Method of manufacture of a transition piece for joining together by welding two ferrous metallic members of austenitic and ferritic steels having different coefficients of thermal expansion, wherein the transition piece is produced by securing together by welding in end to end relation two metal pieces of austenitic and ferritic steel to constitute electrodes for melting in a consumable-electrode arc-furnace, and melting the composite electrode progressively from one end to the other by striking an arc between it and a crucible, the melt being solidified in the crucible to form a composite product constituting a transition piece having at one end a zone of austenitic or substantially austenitic steel, and at the other end a zone of ferritic or substantially ferritic steel, with a transition zone of intermediate composition between the two steels.

References Cited in the file of this patent

UNITED STATES PATENTS

| 890,337 | Connell | June 9, 1908 |
| 2,191,469 | Hopkins | Feb. 27, 1940 |
| 2,389,516 | Kinnear | Nov. 20, 1945 |
| 2,541,764 | Herres et al. | Feb. 13, 1951 |
| 2,769,227 | Sykes et al. | Nov. 6, 1956 |